United States Patent [19]

Hosokawa et al.

[11] Patent Number: 4,754,254

[45] Date of Patent: Jun. 28, 1988

[54] TEMPERATURE DETECTOR

[75] Inventors: Yoichi Hosokawa, Kobe; Minori Yamaguchi, Akashi; Yoshihisa Tawada, Kobe, all of Japan

[73] Assignee: Kanegafuchi Kagaku Kogyo Kabushiki Kaisha, Osaka, Japan

[21] Appl. No.: 905,204

[22] Filed: Sep. 9, 1986

[30] Foreign Application Priority Data

Apr. 17, 1986 [JP] Japan .................................. 61-89130

[51] Int. Cl.⁴ .............................................. H01C 3/04
[52] U.S. Cl. ................................. 338/25; 338/22 SD; 338/306; 338/314
[58] Field of Search ................... 338/25, 22, 22 R, 28, 338/306, 307, 308, 314

[56] References Cited

U.S. PATENT DOCUMENTS 4,047,436 9/1977 Bernard et al. .................... 338/25 X
4,414,274 11/1983 Hieber .............................. 338/25 X

OTHER PUBLICATIONS

S. Tanaka, "Low Temperature", *Experimental Physics Lecture No. 15*, pp. 175–179 and 184, Jul. 1974.

*Primary Examiner*—E. A. Goldberg
*Assistant Examiner*—M. M. Lateef
*Attorney, Agent, or Firm*—Armstrong, Nikaido, Marmelstein & Kubovcik

[57] ABSTRACT

A temperature detector having a semiconductor layer which is a p-type or n-type semiconductor doped by addition of an impurity. The semi- semiconductor is completely amorphous, or substantially amorphous with the inclusion of microcrystals. The temperature detector has good sensitivity at a temperature of not more than 100 K, and has good linearity of the change of resistivity to the change of temperature over a wide range of temperature.

7 Claims, 2 Drawing Sheets

TEMPERATURE DETECTOR

BACKGROUND OF THE INVENTION

The present invention relates to a temperature detector, and more particularly to a temperature detector comprising semiconductor having good linearity of the change of resistivity of the semiconductor to the change of temperature at a low temperature of not more than 100 K.

In general, there have been employed as a contact-type temperature detector a thermocouple, resistance thermometer bulb utilizing a metal such as platinum or thermistor utilizing semiconductor, or the like.

Hitherto, at a low temperature of not more than 100 K., there has been employed a temperature detector using carbon solid resistor which is often employed in an electronic circuit. This kind of sensor measures the temperature by utilizing a phenomenon that the resistivity of the carbon solid resistor changes with the change of temperature. The carbon solid resistor is obtained by adding powder of insulation such as clay, silica and talc to graphite, adding further binding material such as phenol resin and then hot forming the obtained mixture.

The above-mentioned carbon solid resistor has, however, problems in that the temperature dependency of the resistivity of graphite is complex and the reproducibility of resistivity is poor, because the resistor shows metallic property or semiconductive property in compliance with the direction of crystallographic axis due to very large anisotropic of graphite.

Further, there has been hitherto employed a thermistor using germanium as a temperature detector. The thermistor comprises a single crystal of germanium whereinto an impurity such as phosphorus is mixed. In this thermistor, the temperature is measured by detecting the change of resistivity with the change of temperature.

This kind of thermister is superior to the above-mentioned carbon solid resistor in reproducibility of resistivity. It, however, has problems that it is apt to be influenced by a magnetic field, it cannot represent a temperature dependency in one formula over a wide range of temperature, and it costs too much.

The present invention was made in order to solve the above drawbacks and to provide a temperature detector having good linearity of temperature dependency of resistivity even at a low temperature of not more than 100 K.

SUMMARY OF THE INVENTION

In accordance with the present invention, there is provided a temperature detector comprising a semiconductor layer, said semiconductor being doped into a p-type or n-type semiconductor by adding an impurity thereto and being completely amorphous or substantially amorphous and including microcrystals. The temperature detector of the present invention has good sensitivity at a temperature of not more than 100 K. in comparison with conventional temperature detectors, and has good linearity of the change of resistivity to the change of temperature over a wide range of temperature.

The above-mentioned semiconductor, whereto an impurity is added, mainly comprises elements of IV group of the Periodic Table and is a semiconductor of a-Si or $\mu$c-Si (i.e. an alloy including 1 to 90 atomic % of Si or other elements such as SiGe, SiC, SiSn or SiN). Among these alloys, SiGe is preferable since it has low resistance.

DETAILED DESCRIPTION

Referring now to the accompanying drawings, a temperature detector of the present invention is explained.

Figure 1:
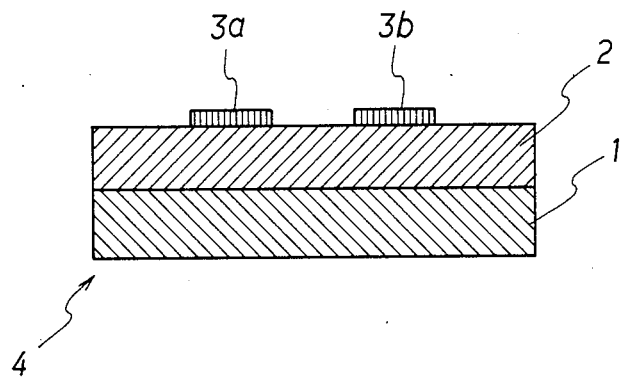
FIG. 1 is a sectional view of the embodiment 1 of a temperature detector of the present invention.

FIG. 1 shows the first embodiment (hereinafter referred to as embodiment 1) of a temperature detector of the present invention. In FIG. 1, numeral 1 is an insulating substrate made of glass whereto a semiconductor layer 2 is adhered with keeping its upper surface and the upper surface of the insulating substrate 1 substantially parallel. The semiconductor layer 2 comprises non-crystalline hydrogenated silicon including microcrystals, whereto phosphorus is added as an impurity. Coplanar-type Al electrodes 3a and 3b are adhered to a part of the upper surface of the semiconductor layer 2. The area of each Al electrode and the distance between two electrodes are not particularly limited but might be properly determined. The thickness of the insulating substrate 1, semiconductor layer 2 and electrodes 3a and 3b are preferably 1 $\mu$m to 5000 $\mu$m, 0.003 $\mu$m to 10 $\mu$m and 0.01 $\mu$m to 1 $\mu$m, respectively. A temperature detector 4 consists of the insulating substrate 1, semiconductor layer 2 and electrodes 3a and 3b.

In a temperature detector 4 of the embodiment 1 having the above construction, the temperature is measured by connecting the electrodes 3a and 3b to a positive power electrode and negative power electrode respectively (the reverse connection is of course employable) using lead wire (not shown in FIG. 1), letting direct current flow through the semiconductor layer 2 and measuring the electric resistance of the semiconductor layer 2 between the electrode 3a and electrode 3b.

Next, there is explained a method for producing a temperature detector of the embodiment 1.

Figure 2:
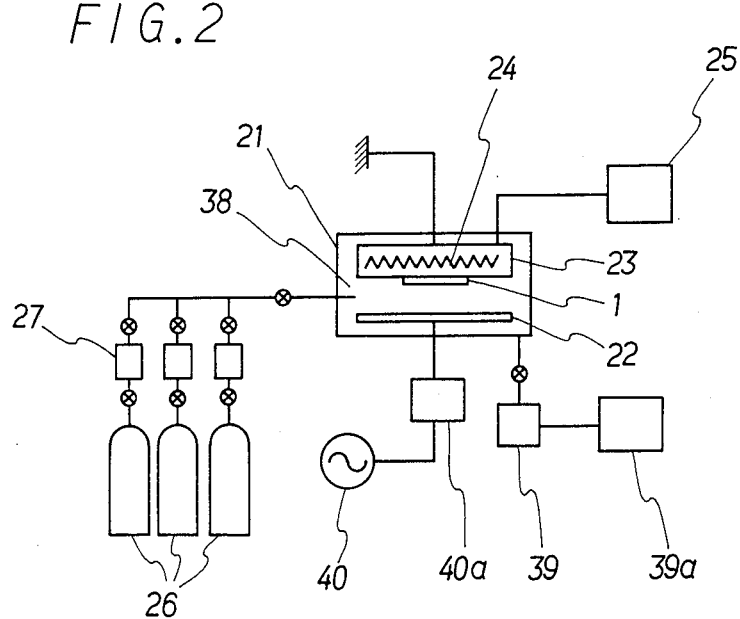
FIG. 2 is a schematic view of an apparatus employed in producing a temperature detector of the embodiment 1.

FIG. 2 shows an apparatus employed in producing a temperature detector of the embodiment 1. The apparatus shown in FIG. 2 is a typical apparatus wherein CVD method (Chemical Vapor Deposition method) is carried out. In FIG. 2, numeral 21 is a vacuum vessel wherein a cathode electrode 22 and an anode electrode 23, which is opposing to the cathode electrode 22, are disposed. In the anode electrode 23, there is provided a heater 24 which serves to heat the anode electrode 23 as a result of being energized by a power source 25 for heater.

Gases such as $SiH_4$, $PH_3$ and $H_2$ which constitute the semiconductor layer are supplied into the vacuum vessel 21 from gas bombs 26 via flow controllers 27 and an inlet port 38. Gases in the vacuum vessel 21 are exhausted by a pump 39 through a treating apparatus of exhaust gas 39a. High frequency voltage is applied to the cathode electrode 22 by a high frequency power supply 40 via a matching circuit 40a. On the anode electrode 23, there is fixed the insulating substrate 1 whereon the semiconductor layer 2 is formed.

By carrying out glow discharge in a mixed gas of SiH$_4$, PH$_3$ and H$_2$, there is obtained a semiconductor layer 2 having a thickness of 1 μm and comprising amorphous hydrogenated silicon including microcrystals on an insulating substrate 1 made of glass having a thickness of 700 μm, the substrate being available from Corning Corporation under the commercial name of Corning 7059. The temperature detector 4 can be obtained by forming Al electrodes 3a and 3b having a thickness of 0.3 μm on the semiconductor layer 2 employing a vacuum deposition method.

Next, other embodiments of temperature detectors of the present invention are explained.

Figure 3:
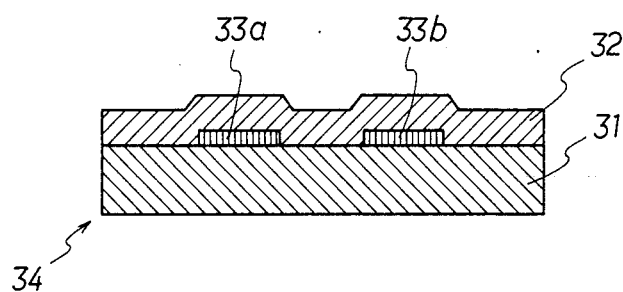
FIG. 3 is a sectional view of the embodiment 2 of a temperature detector of the present invention.

FIG. 3 shows the second embodiment (hereinafter referred to as embodiment 2) of a temperature detector of the present invention. In FIG. 3, numeral 31 is an insulating substrate similar to the insulating substrate 1 in the embodiment 1. Coplanar-type Al electrodes 33a and 33b are adhered to a part of the upper surface of the insulating substrate 31. The area of each Al electrode and the distance between two electrodes are not particularly limited but might be properly determined. Further, on the upper surface of the substrate 31, there is formed a semiconductor layer 32 to cover the eleltrodes 33a and 33b. The thickness of the insulating substrate 31, semiconductor layer 32 and electrodes 33a and 33b are preferably 1 μm to 5000 μm, 0.003 μm to 10 μm and 0.05 μm to 1 μm, respectively. A temperature detector 34 consists of the insulating substrate 1, semiconductor layer 2 and electrodes 3a and 3b. In a temperature detector 34 of the embodiment 2, the temperature is measured by letting direct current flow through the semiconductor 32 via the electrode 33a and electrode 33b.

Figure 4:
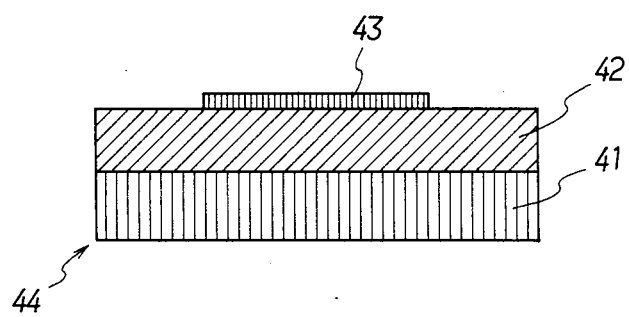
FIG. 4 is a sectional view of the embodiment 3 of a temperature detector of the present invention.

FIG. 4 shows the third embodiment (hereinafter referred to as embodiment 3) of a temperature detector of the present invention. In FIG. 4, numeral 41 is a conductive substrate made of metal such as Al, Cu or Fe, TCO, crystalline Si, or the like. A semiconductor layer 42 of the same material as in the embodiment 1 is adhered onto the conductive substrate 41 with keeping the upper surface of the semiconductor layer 42 and that of the conductive substrate 41 substantially paralell. A layer-shaped Al electrode 43 is adhered onto the central part of the upper surface of the semiconductor layer 42. The area of the Al electrode 43 is not particularly limited but might be properly determined. The thickness of the conductive substrate 41, semiconductor layer 42 and electrode 43 are preferably 50 μm to 5000 μm, 0.1 μm to 10 μm and 0.05 μm to 1 μm, respectively. A temperature detector 44 consists of the conductive substrate 41, semiconductor layer 42 and electrode 43. In the temperature detector of the embodiment 3, the electrode 43 and conductive substrate 41 correspond to the electrodes 3a and 3b in the embodiment 1 respectively, and the temperature is measured by letting direct current flow through the semiconductor layer 42 via the electrode 43 and conductive substrate 41, which is the same manner as in the embodiment 1.

Figure 5:
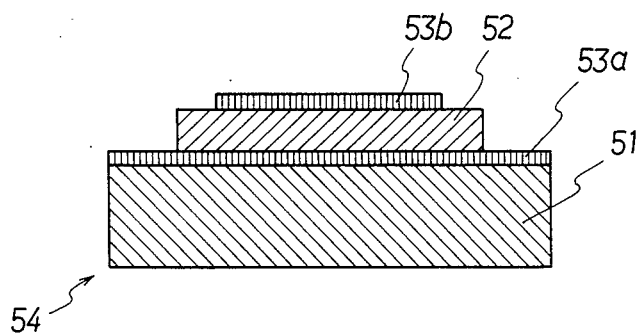
FIG. 5 is a sectional view of the embodiment 4 of a temperature detector of the present invention.

FIG. 5 shows the fourth embodiment (hereinafter referred as embodiment 4) of a temperature detector of the present invention. In FIG. 5, numeral 51 is an insulating substrate of the same material as in the embodiment 1. A layer-shaped Al electrode 53a is adhered to the upper surface of the substrate 51, the area of Al electrode 53a being the same as the upper surface of the substrate 51. On the upper surface of the electrode 53a, there is adhered a semiconductor layer 52 of the same material as in the embodiment 1, the area of the semiconductor layer 52 being a little smaller than that of the substrate 53a. Further, on the upper surface of the semiconductor layer 52, there is formed layer-shaped Al electrode 53b having a little smaller area than the semiconductor 52. The thickness of the insulating substrate 51, semiconductor layer 52, electrode 53a and electrode 53b are preferably 50 μm to 5000 μm, 0.1 μm to 10 μm and 0.05 μm to 1 μm. A temperature detector 54 consists of the insulating subtrate 51, electrode 53a, semiconductor layer 52 and electrode 53b. In the temperature detector of the embodiment 4, the temperature is measured by letting direct current flow through the semiconductor layer 52 via the electrode 53a and electrode 53b, which is the same manner as in the embodiment 1.

In the above-mentioned embodiments 1 to 4, the semiconductor layer is an amorphous phosphorus including microcrystals prepared by adding phosphorus of the Group V of the Periodic Table as an impurity into a semiconductor. The semiconductor layer, however, might be such that can be obtained by adding boron of Group III of the Periodic Table as an impurity. Further, instead of an amorphous hydrogenated silicon, there can also be employed an amorphous silicon, amorphous silicon carbide or semiconductor including a partly microcrystal line region such as μc-Si. In case that the resistance of an amorphous semiconductor layer becomes larger, the resistance of the semiconductor can be made small by microcrystallizing a part of the amorphous semiconductor layer.

As is described hereinbefore, a temperature detector of the present invention comprises a semiconductor layer of which semiconductor is doped into p-type or n-type semiconductor by adding an impurity thereinto and is completely amorphous or substantial amorphous including microcrystals. Accordingly, the linearity of the change of resistance of a semiconductor layer to the change of temperature can be improved in a wider temperature range in comparison with a conventional temperature detector at a low temperature of not more than 100 K.

The superiority of the linearity of a temperature detector of the present invention is shown in Table 1.

In Table 1, the linearity is estimated according to the following criteria.
A: very excellent
B: excellent
C: good

TABLE 1

| Temperature range | Linearity |
|---|---|
| 100 K. to 77 K. | C |
| 77 K. to 50 K. | C |
| 50 K. to 20 K. | B |
| 20 K. to 4.2 K. | A |

What is claimed is:

1. A temperature detector consisting essentially of a semiconductor layer and two opposing electrodes provided on the semiconductor layer, wherein the two electrodes are in contact with the semiconductor layer, and the semiconductor is doped into a p-type or n-type semiconductor by addition of an impurity, said semiconductor being selected from the group consisting of completely amorphous semiconductors, and substantially amorphous semiconductors containing microcrystals.

2. The temperature detector of claim 1, wherein the semiconductor comprises an element of the Group IV of the Periodic Table or a compound thereof, and the inpurity comprises an element of the Group III of the Periodic Table.

3. The temperature detector of claim 1, wherein the semiconductor comprises an element of the Group IV of the Periodic Table or a compound thereof, and the impurity comprises an element of the Group V of the Periodic Table.

4. The temperature detector of claim 1, wherein the thickness of the semiconductor is 0.003 to 100 μm.

5. The temperature detector of any one of claims 1 to 2, wherein the semiconductor is silicon or a silicon compound.

6. The temperature detector of any one of claims 1 to 2, wherein the semiconductor is germanium or a germanium compound.

7. The temperature detector of claim 1, wherein one of said two electrodes is a conducting substrate on which said semiconductor layer is provided.

* * * * *